(12) United States Patent
Shimizu

(10) Patent No.: US 10,510,229 B2
(45) Date of Patent: Dec. 17, 2019

(54) MOUNT CAPABLE OF MOUNTING ACCESSORY, AND IMAGE PICKUP APPARATUS

(71) Applicant: CANON KABUSHIKI KAISHA, Tokyo (JP)

(72) Inventor: Yoko Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/102,831

(22) Filed: Aug. 14, 2018

(65) Prior Publication Data

US 2019/0066467 A1 Feb. 28, 2019

(30) Foreign Application Priority Data

Aug. 29, 2017 (JP) ................................. 2017-164418

(51) Int. Cl.
| | |
|---|---|
| *G03B 13/14* | (2006.01) |
| *G03B 17/56* | (2006.01) |
| *H04N 5/225* | (2006.01) |
| *G08B 13/12* | (2006.01) |
| *G08B 13/06* | (2006.01) |
| *G08B 13/14* | (2006.01) |

(52) U.S. Cl.
CPC ......... *G08B 13/1445* (2013.01); *G03B 17/56* (2013.01); *G08B 13/12* (2013.01); *H04N 5/2252* (2013.01)

(58) Field of Classification Search
CPC .... G08B 13/1445; G08B 13/06; G08B 13/12; H04N 5/2254; H04N 5/2252; G03B 17/56; G03B 17/14; G03B 17/12
See application file for complete search history.

(56) References Cited

U.S. PATENT DOCUMENTS

| | | | | |
|---|---|---|---|---|
| 2008/0304818 | A1* | 12/2008 | Kranz | G02B 7/14 396/310 |
| 2012/0240641 | A1* | 9/2012 | Fong | E05B 67/383 70/58 |
| 2013/0100344 | A1* | 4/2013 | Kikuchi | G03B 17/14 348/375 |

(Continued)

FOREIGN PATENT DOCUMENTS

JP H11134565 A 5/1999

*Primary Examiner* — Shahbaz Nazrul
(74) *Attorney, Agent, or Firm* — Rossi, Kimms & McDowell LLP

(57) ABSTRACT

A mount aims to prevent an accessory mountable in an image pickup apparatus from being stolen using a simple configuration. The mount is disposed in a main body of an image pickup apparatus, and comprises a first mount portion attachable/detachable with respect to an accessory. The first mount portion includes a fixing portion fixed to the main body of the image pickup apparatus, a fixed mount portion fixed and held to the fixing portion, a movable mount portion relatively rotatable with respect to the fixed mount portion with an optical axis of the image pickup apparatus as a center, a mount ring rotatable with the movable mount portion, and an insertion portion to which an operation member to switch a non-lock state and a lock state of the accessory with respect to the first mount portion is inserted from an outside of the first mount portion.

13 Claims, 6 Drawing Sheets

(56) References Cited

U.S. PATENT DOCUMENTS

| | | | | |
|---|---|---|---|---|
| 2015/0212395 A1* | 7/2015 | Kuroda | ................ | H04N 5/2252 |
| | | | | 396/530 |
| 2016/0112609 A1* | 4/2016 | Hsu | ........................ | G03B 17/02 |
| | | | | 348/143 |
| 2018/0263104 A1* | 9/2018 | Hamada | ............. | H04N 5/22521 |
| 2018/0278817 A1* | 9/2018 | Shimizu | ................... | G03B 9/02 |
| 2018/0348611 A1* | 12/2018 | Yamazaki | ............ | G02B 27/646 |
| 2019/0041724 A1* | 2/2019 | Nishijima | .............. | G02B 5/005 |

\* cited by examiner

MOUNT CAPABLE OF MOUNTING ACCESSORY, AND IMAGE PICKUP APPARATUS

BACKGROUND OF THE INVENTION

Field of the Invention

The present invention relates to a mount which is capable of mounting an accessory, and an image pickup apparatus which is provided with the mount.

Description of the Related Art

Conventionally, there is known a product in which an accessory such as an interchangeable lens can be attached/detached with respect to an image pickup apparatus body such as a digital camera. In many cases, such a product is sold in a store or displayed in an exhibition in a state where the accessory is mounted in the image pickup apparatus, and a state where the product may be freely held by a user's hand. In addition, in recent years, the image pickup apparatus is fixed to a tripod or a universal head, and is increasingly operated in remote place separated from the image pickup apparatus. In this case, for example, a camera for monitoring or observing a subject, or a camera for broadcasting a video may be disposed at a position where the user can hold the camera to easily perform maintenance.

As described above, there is a need to prevent theft of these apparatuses under a circumstance that other users may freely hold the image pickup apparatus and the accessory at a position separated from an owner of the image pickup apparatus and the accessory.

For example, Japanese Laid-Open Patent Publication (kokai) No. H11-134565 discloses a method for fixing the camera to a support base equipped with a wire rope as a camera theftproof countermeasure.

However, in the method disclosed in Japanese Laid-Open Patent Publication (kokai) No. H11-134565, a lame support base to mount the wire rope is necessarily fixed to the camera, and thus an entire image pickup system is increased in size. In addition, since the wire rope may be simply cut using general tools such as nippers, the theft is not sufficiently prevented only using the wire rope. In addition, the support base in Japanese Laid-Open Patent Publication (kokai) No. H11-134565 is not attached to the interchangeable lens, and there is no mention on a theftproof method for the accessory such as the interchangeable lens which is attached to the image pickup apparatus.

SUMMARY OF THE INVENTION

The present invention aims to prevent an accessory mountable in an image pickup apparatus from being stolen using a simple configuration without increasing a mechanism in size.

In an aspect of the present invention, there is provided with a mount that is capable of being disposed in a main body of an image pickup apparatus, the mount comprising a first mount portion configured to be attachable/detachable with respect to an accessory, wherein the first mount portion includes: a fixing portion that is fixed to the main body of the image pickup apparatus; a fixed mount portion that is fixed and held to the fixing portion; a movable mount portion that is relatively rotatable with respect to the fixed mount portion with an optical axis of the image pickup apparatus as a center; a mount ring that is rotatable with the movable mount portion; and an insertion portion to which an operation member to switch a non-lock state and a lock state of the accessory with respect to the first mount portion is inserted from an outside of the first mount portion, the insertion portion includes a first fitting portion to which an operation portion of the operation member is fitted, and a second fitting portion to which a support portion different from the operation portion of the operation member is fitted, the first fitting portion is formed by an opening that is formed by opening a side where the accessory is mounted in the optical axis direction, and a pair of wall portions that are opposed to each other with reference to the circumferential direction of the first mount portion, and the second fitting portion has a regulation portion to regulate a movement of the operation member in the optical axis direction in a state where the operation member is fitted, and is disposed at a position different from the first fitting portion in the optical axis direction.

According to the present invention, it is possible to prevent an accessory mountable in an image pickup apparatus from being stolen using a simple configuration without increasing a mechanism in size.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

(Basic Configurations)

Figure 1:
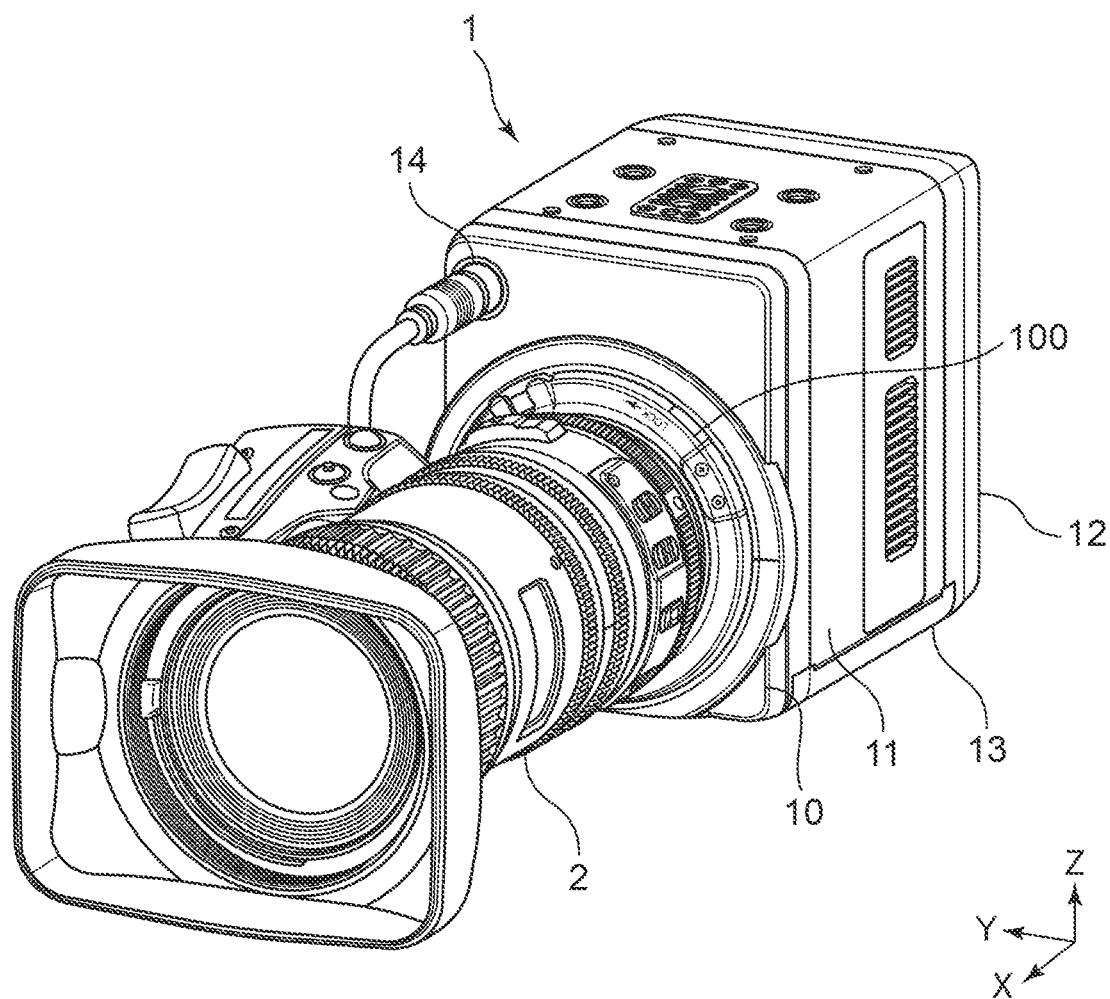
FIG. 1 is a perspective exterior view of an image pickup system according to an embodiment of the present invention when viewed from a front side (subject side).

FIG. 1 is a perspective exterior view showing an entire image pickup system when viewed from a front side (subject side) in a state where the interchangeable lens 2 which is attachable/detachable with respect to the camera body 1 is mounted in the camera body 1 equipped with a lens theftproof mechanism according to an embodiment of the present invention. In the following description, it should be noted that a side (subject side) where the interchangeable lens 2 is mounted to the camera body 1 is referred to as a front side, and the other side is referred to as a rear side.

In addition, as shown in FIG. 1, three-dimensional coordinates are set with the camera body 1 as a reference, and X, Y, and Z axis directions in the drawing correspond to front and rear, right and left, and up and down directions. The right and left direction and the up and down direction indicate a right and left direction and an up and down direction in a case where the camera body 1 is viewed from the front side. Specifically, in an optical axis direction of the interchangeable lens 2 in a state where the interchangeable lens 2 is mounted in the camera body 1, a direction facing the subject side from the camera body 1 is set to an X-axis positive direction, and the opposite direction thereof is set to an X-axis negative direction. In addition, a direction perpendicular to the X axis and facing the left side viewed from the front side of the camera body 1 is set to a Y-axis positive direction, and the opposite direction thereof is set to a Y-axis negative direction. Further, a direction perpendicular to the X and Y axes and facing the upper side viewed from the front side of the camera body 1 is set to a Z-axis positive direction, and the opposite direction thereof is set to a Z-axis negative direction. In the camera body 1, a face in the X-axis positive direction is set to a front surface, a face in the X-axis negative direction is set to a rear surface, a face in the Y-axis positive direction is set to a left surface, a face in the Y-axis negative direction is set to a right surface, a face in the Z-axis positive direction is set to an upper surface, and a face in the Z-axis negative direction is set to a bottom surface.

The camera body 1 (the main body portion of an image pickup apparatus in the present embodiment) is provided with an image pickup unit which includes a solid-state image pickup device of a charge accumulation type such as a CMOS which converts an optical flux of a subject guided by the interchangeable lens 2 into an electric signal, and a board unit which acquires a power input to perform an image processing and a video output. The image pickup unit and the board unit are not shown in the drawing, and the detailed description will be omitted.

An exterior cover which protects inner configurations of the camera body 1 is configured by a front cover 10, a top cover 11 of an approximate U shape, a rear cover 12, and a bottom cover 13. In the front surface of the camera body 1 there is provided with a lens mount (first mount portion) 100 which is provided with an opening to guide an optical image of the subject to the image pickup unit. A lens terminal 14 is a terminal to which a cable is connectable to supply power to communicate by electrically connecting the camera body 1 and the interchangeable lens 2, and disposed in the outer peripheral portion of the lens mount 100 (described below) in the front surface of the camera body 1.

The lens mount 100 is a mount (mount mechanism) which is disposed in the camera body 1 and is roughly classified into a fixed mount portion and a movable mount portion. The movable mount is provided with a male screw portion to be engaged with a female screw disposed in the fixed mount portion. The lens mount 100 is structured to rotate the movable mount about an optical axis, and to attract a bayonet claw portion on a side for an accessory disposed in the interchangeable lens 2 in the X-axis negative direction. It should be noted in the present embodiment that a mount portion disposed on the camera body 1 to which the interchangeable lens 2 is mountable is called a lens mount.

(Configuration of Lens Mount 100)

Figure 2A:
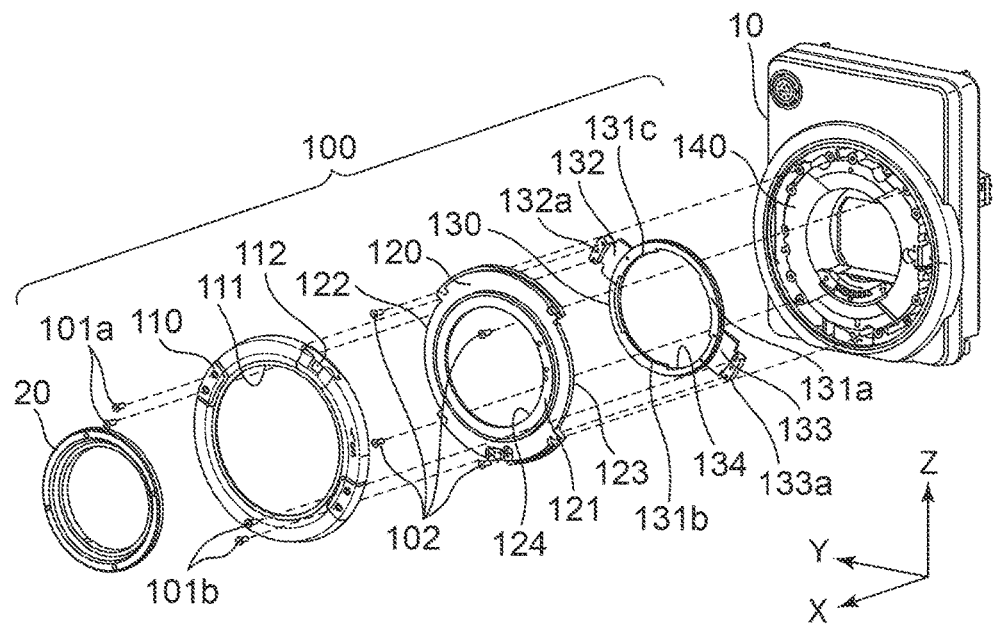
FIGS. 2A and 2B are exploded perspective views which are useful in describing a lens mount 100 according to the embodiment of the present invention.
Figure 2B:
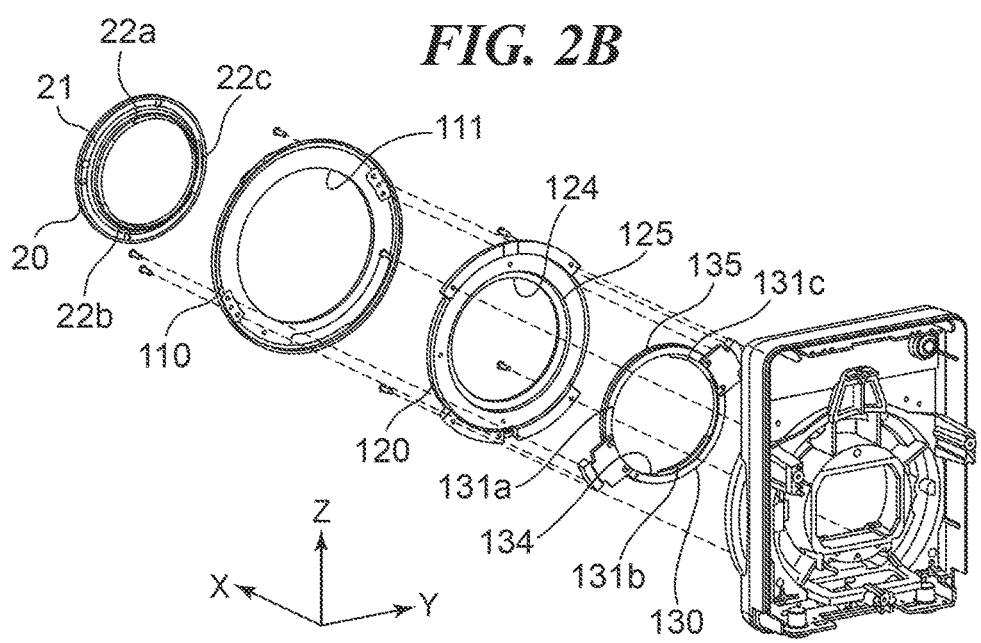

Next, the details of the lens mount 100 will be described with reference to FIGS. 2A and 2B. FIGS. 2A and 2B are exploded perspective views which are useful in describing a lens mount 100 according to the embodiment of the present invention. FIG. 2A shows an exploded perspective view in a case where the lens mount 100 is viewed from the front side. FIG. 2B shows an exploded perspective view in a case where the lens mount 100 is viewed from the rear side. It should be noted that a mount portion 20 disposed in the interchangeable lens 2 is also shown together with the lens mount 100 in FIGS. 2A and 2B for explanation. It should be noted that the mount portion (second mount portion) 20 disposed in the interchangeable lens 2 is structured on a basis of a so-called bayonet coupling system in which a plurality of claw portions can be engaged with each other in the optical axis direction when the lens mount 100 of the camera body 1 rotates. In other words, the mount portion 20 of the interchangeable lens 2 and the lens mount of the camera body 1 are relatively rotatable. The mount portion 20 includes a lens-side mount surface 21 which is a mount reference surface in the interchangeable lens 2 and bayonet claws 22a, 22b, and 22c, and is attachable/detachable with respect to the lens mount 100 of the camera body 1.

As shown in FIGS. 2A and 2B, the lens mount 100 disposed in the camera body 1 includes portions 101a to 140. The lens mount 100 is provided with a base portion 140, a fixed mount portion 120, a movable mount portion 130, a mount ring 110, and various types of fixed screws 101 and 102.

The fixed mount portion 120 includes a body-side mount surface 121 which is a mount reference surface of the camera body 1, recess portions 122 and 123, an opening 124, and a female screw portion 125. Then, the fixed mount portion 120 is fixed and held by the fixed screw 102 with respect to the base portion 140 as a fixing portion in the lens mount 100. The base portion 140 is fixed to a frame (not shown) which is disposed in the front cover 10 so as to be coupled to the front cover 10. The movable mount portion 130 includes claw portions 131a, 131b, and 131c, arm portions 132 and 133, an opening 134, and a male screw portion 135. The male screw portion 135 is screwed with the female screw portion 125 of the fixed mount portion 120.

When the movable mount portion 130 is screwed to the fixed mount portion 120, projection portions 132a and 133a formed at the tip end of the arm portions 132 and 133 protrude in the optical axis direction from the recess portions 122 and 123 of the fixed mount portion 120 and rotate. In the mount ring 110, the projection portions 132a and 133a are fixed to fixed screws 101a and 101b respectively so as to be integrally configured with the movable mount portion 130 to interpose the fixed mount portion 120 therebetween. The mount ring 110 includes an opening 111 and a tool insertion portion 112. A detailed configuration of the tool insertion portion 112 will be described below with reference to FIGS. 3A and 3B.

When the interchangeable lens 2 is mounted in the camera body 1, first, the mount portion 20 of the interchangeable lens 2 is inserted to the opening 111 of the mount ring 110 and the opening 124 of the fixed mount portion 120. In this state, as shown in FIG. 2B, the claw portions 131a, 131b, and 131c of the movable mount portion 130 on a side of the image pickup apparatus and the bayonet claws 22a, 22b, and 22c do not overlap each other on an optical axis projection. Then, in this state, the mount portion 20 of the interchangeable lens 2 is inserted to the opening 134 of the movable mount portion 130 until coming into contact with the lens-side mount surface 21 and the body-side mount surface 121.

Next, the mount ring 110 is rotated in a counterclockwise direction when viewed from the front surface of the camera body 1 to rotate the claw portions 131a, 131b, and 131c of the movable mount portion 130 to cause them to overlap with the corresponding claws of the bayonet claws 22a, 22b, and 22c of the interchangeable lens 2 on the optical axis projection. At this time, since the female screw portion 125 of the fixed mount portion 120 and the male screw portion 135 of the movable mount portion 130 are screwed, the movable mount portion 130 moves in the X-axis negative direction as rotating. In this way, the bayonet claws 22a, 22b, and 22c and the corresponding claws of the claw portions 131a, 131b, and 131c of the movable mount portion 130 come into contact (screwed) to each other in the X axis direction, and the attraction of the bayonet claws 22a, 22b, and 22c toward the camera body 1 is ended.

(Configuration of Theftproof Mechanism)

Figure 3A:
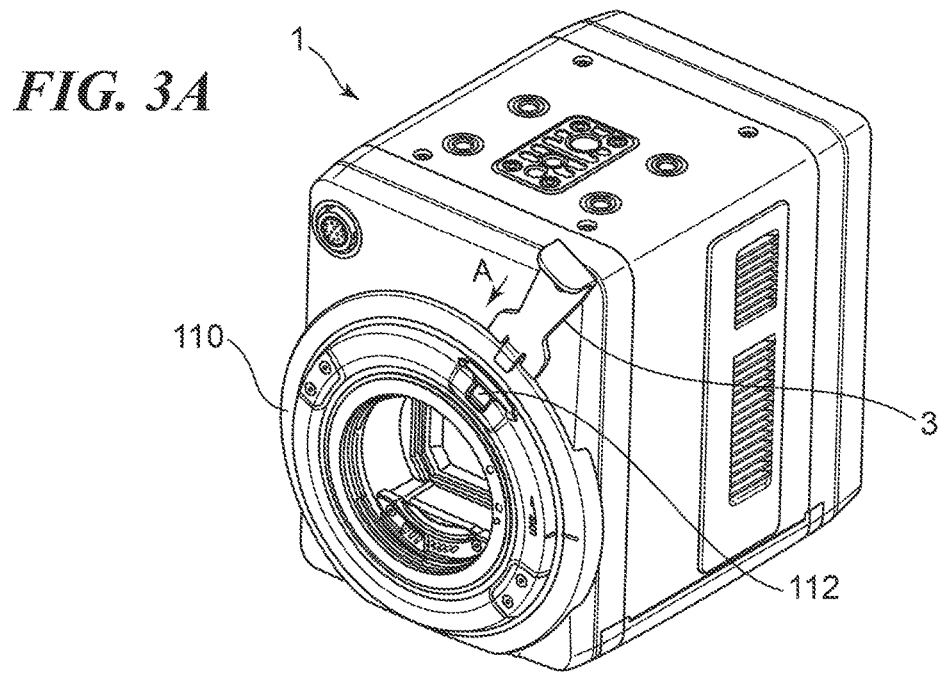
FIGS. 3A and 3B are views which are useful in describing an operation of a rotary tool 3 with respect to the lens mount 100 according to the embodiment of the present invention.
Figure 3B:
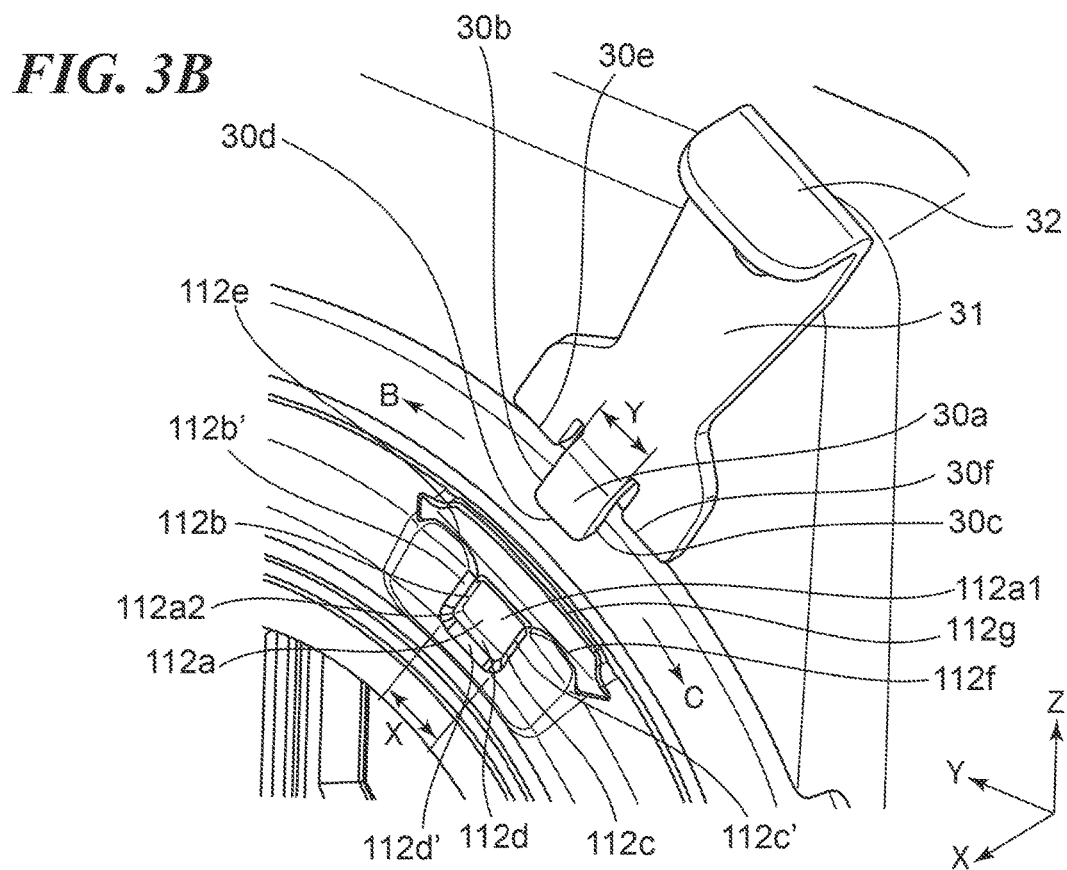

Next, a theftproof mechanism of the accessory with respect to the camera body 1 in the present embodiment will be described with reference to FIGS. 3A to 5. First, the configuration of the tool insertion portion 112 disposed in the mount ring 110 will be described with reference to FIGS. 3A and 3B. FIGS. 3A and 3B are views which are useful in describing an operation of a rotary tool 3 with respect to the lens mount 100 according to the embodiment of the present invention. FIG. 3A is a perspective exterior view which is useful in describing a state where the rotary tool 3 is inserted to the camera body 1 to rotate the mount ring 110. FIG. 3B is an enlarged view which is useful in describing the vicinity of the tool insertion portion 112 in FIG. 3A. In the following description, it should be noted that the respective operations will be described on an assumption that the rotary tool 3 is normally inserted from the outside of the mount ring 110 toward the optical axis of the camera body 1 which is almost the same meaning as the center line of the lens mount 100.

As shown in FIG. 3A, the rotary tool 3 is first inserted to the tool insertion portion 112 in a direction facing the optical axis from the outside of the mount ring 110 depicted with arrow A in order to rotate the mount ring 110. As shown in FIG. 3B, the rotary tool 3 is divided into three portions at the tip end of the insertion side, and a first support portion 30e, a center operation portion 30a, and a second support portion 30f are disposed from the left side of the drawing. Among them, the center operation portion 30a is disposed on the X-axis positive direction side with respect to the first support portion 30e and the second support portion 30f, and the center operation portion 30a is provided with a step with respect to the first support portion 30e and the second support portion 30f. In other words, in the tool insertion portion 112, there is formed a step in the optical axis direction between a first fitting portion to which the center operation portion 30a is fitted, and second fitting portions to which the first support portion 30e and the second support portion 30f are fitted, according to the above step of the rotary tool.

The rotary tool 3 is an operation member, other than the camera body 1, which includes an extension portion 31 which extends toward the outside of the mount ring 110 from the tip end on the insertion side, and the finger hold portion (operation portion) 32 which is on the opposite side to the tip end of the insertion side. An operation method of the finger hold portion 32 will be described with reference to FIG. 5.

In the tool insertion portion 112 of the mount ring 110, there is formed a recess portion 112a which is a fitting portion (first fitting portion) to which the center operation portion 30a of the rotary tool 3 is fitted. The recess portion 112a includes an opening 112a1 through which the surface in the X-axis positive direction and the surface where the rotary tool 3 is inserted are opened, and a wall portion 112a2 which extends in three directions to surround side surfaces 30b, 30c, and 30d of the center operation portion 30a in a state where the rotary tool 3 is fitted to the tool insertion portion 112.

The wall portion 112a2 is formed by straight portions 112b, 112c, and 112d and taper portions 112b', 112c', and 112d'. Among them, the straight portions 112b, 112c, and 112d faces respectively the side surfaces 30b, 30c, and 30d of the center operation portion 30a of the rotary tool 3 in a state where the rotary tool 3 is fitted to the tool insertion portion 112. The taper portions 112b', 112c', and 112d' are formed with a gradient along the opening 112a1 on a side where the interchangeable lens 2 is mounted, so as to be widened from the straight portions 112b, 112c, and 112d toward the X-axis positive direction.

A width X (a width in a circumferential direction) formed by the straight portion 112b and the straight portion 112c is set to be a dimension having a dimensional tolerance as much as fitted to a width Y formed by a wall 30b and a wall 30c of the center operation portion 30a. Therefore, an external force is applied to the rotary tool 3 toward the circumferential direction of the mount ring 110 depicted by arrows B and C in the drawing in a state where the rotary tool 3 is inserted to the tool insertion portion 112, so that the external force works on the mount ring 110 to rotate the mount ring 110. In other words, when the external force is applied to the rotary tool 3 in a direction of arrow B, the wall 30b of the rotary tool 3 pushes the straight portion 112b of the mount ring 110, whereas when the external force is applied to the rotary tool 3 in a direction of arrow C, the wall 30c of the rotary tool 3 pushes the straight portion 112c of the mount ring 110. With the above-described configuration, it is possible to rotate the mount ring 110 using the rotary tool 3.

When the rotary tool 3 is inserted to the tool insertion portion 112, the first support portion 30e and the second support portion 30f come into contact (interposed) with first to third regulation portions 112e, 112f, and 112g in the X axis direction which are formed in the tool insertion portion 112. In other words, each of the regulation portions 112e, 112f, and 112g is formed to extend in a direction (a radial direction of the lens mount 100) perpendicular to the X axis in order to regulate the movement of the rotary tool 3 in the X axis. Then, in a case where the rotary tool 3 is inserted to the tool insertion portion 112, the first support portion 30e is interposed between the first regulation portion 112e and the third regulation portion 112g in the X axis. In addition, the second support portion 30f is interposed between the second regulation portion 112f and the third regulation portion 112g. With the configuration, the movement of the rotary tool 3 in the X axis direction is regulated.

It should be noted that the regulation portions 112e, 112f, and 112g are formed to extend from the outside of the mount ring 110 toward the radial direction perpendicular to the X axis (or the optical axis). Then, each of the regulation portions has a taper shape such that a height toward the radial direction of a portion connected to the outer peripheral portion of the mount ring 110 is changed gradually. In the present embodiment, groove portions formed by the regulation portions 112e, 112f, and 112g are called a fitting portion (second fitting portion) to which the first and second support portions 30e and 30f are fitted. Then, the second fitting portion is configured not to regulate the movement of the rotary tool 3 in the circumferential direction only by providing a smooth slope (taper) in the circumferential direction (a rotation direction of the movable mount portion 130) of the lens mount 100.

In this respect, the description will be given about a case where the interchangeable lens 2 is detached with respect to the camera body 1 using a tool which is not provided with the configuration of the above rotary tool 3. In this case, it is assumed that the rotary tool 3 is not provided with the first support portion 30e and the second support portion 30f, but only provided with the center operation portion 30a. For example, a general tool such as a flat-headed driver which is easily available to a user may be assumed.

In a case where such a tool is used, the surface in the X-axis positive direction of the recess portion 112a is opened in the camera body 1. Therefore, the movement in the X axis direction of the tool cannot be regulated. Further, since the tool insertion portion 112 is provided with the taper portions 112b', 112c', and 112d', the tool easily falls out of the recess portion 112a even when the tool shaped only to include the center operation portion 30a is operated toward the direction of arrow B and the direction of arrow C in the drawing. In other words, in order to prevent that the interchangeable lens 2 is detached using a general tool, an opening (opening portion) facing the X-axis positive direction such as the recess portion 112a is provided in the tool insertion portion 112 of the lens mount 100. Namely, for example, even when a general tool such as the flat-headed driver is used, the tool easily falls out of the recess portion 112a in the detaching operation of the interchangeable lens 2. Therefore, it is possible to prevent the mount ring 110 from easily rotating, and thus theft of a lens can be prevented. It should be noted that a large projecting place is not disposed in the surface (a side of the front surface) of the mount ring 110; accordingly, the mount ring 110 is hardly rotated using a general-purpose tool.

It should be noted that, as the configuration of the tool insertion portion 112, the recess portion 112a may be formed only by the taper portions 112b', 112c', and 112d' without providing the straight portions 112b, 112c, and 112d. Even in this case, the movement in the X axis direction of the rotary tool 3 is regulated by the regulation portions 112e, 112f. Therefore, the rotary tool 3 can normally rotate without falling.

In addition, in a case where the rotary tool 3 is inserted to the tool insertion portion 112, the first support portion 30e and the second support portion 30f of the rotary tool 3 are fitted (abut) to the groove portion which is formed by the regulation portions 112e, 112f and the regulation portion 112g. Therefore, the tool insertion portion 112 may be configured to be opened toward the optical axis without providing the straight portion 112d.

In addition, the optical axis direction movement of the rotary tool 3 may be regulated by the surfaces in the X-axis negative direction of the regulation portions 112e and 112f and the recess portion 112a for example. In this case, the regulation portion 112g may be not provided.

Figure 4A:
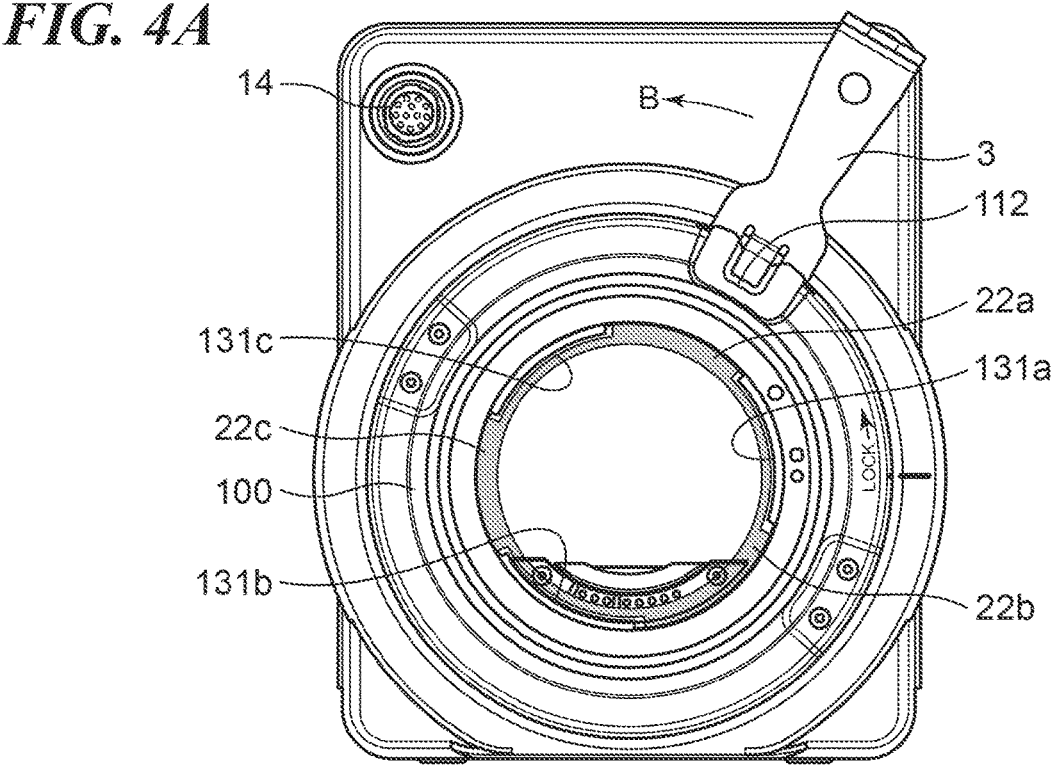
FIGS. 4A and 4B are views which are useful in describing a method for attaching and detaching an interchangeable lens 2 with respect to a camera body 1 according to the embodiment of the present invention.
Figure 4B:
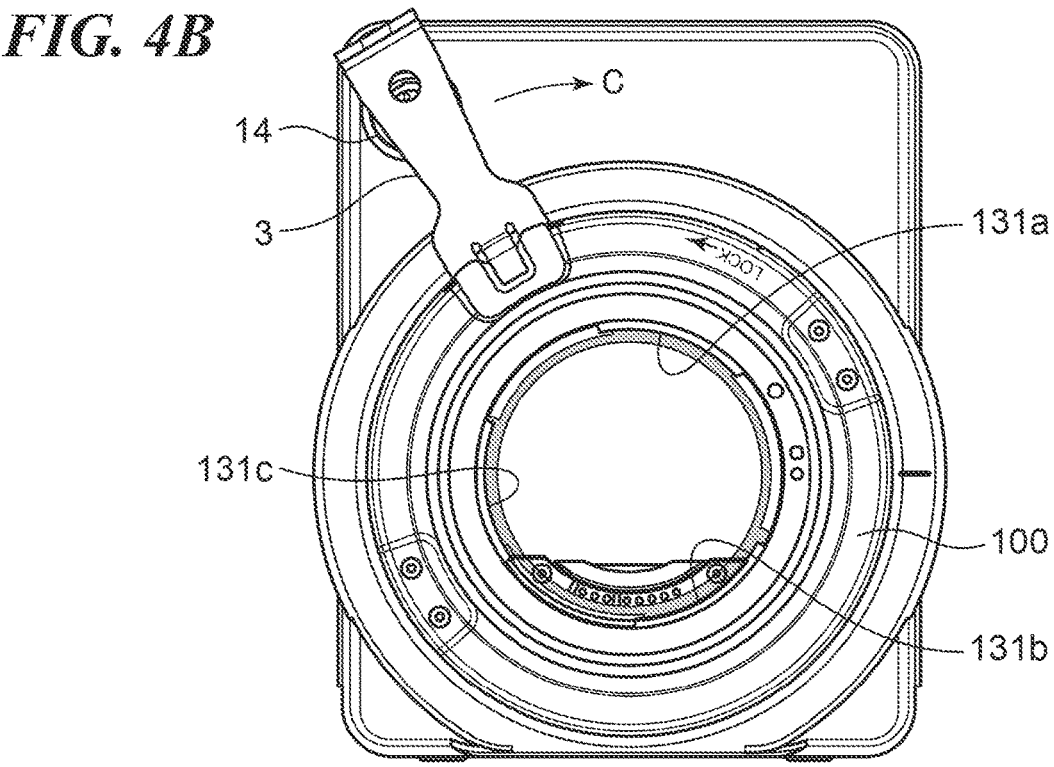

Next, a method for attaching and detaching the interchangeable lens 2 with respect to the camera body 1 using the rotary tool 3 will be described with reference to FIGS. 4A and 4B. FIGS. 4A and 4B are views which are useful in describing a method for attaching and detaching the interchangeable lens 2 with respect to the camera body 1 according to the embodiment of the present invention. FIG. 4A shows a non-lock state of the interchangeable lens 2, whereas FIG. 4B shows a lock state of the interchangeable lens 2. It should be noted that only the bayonet claws 22a, 22b, and 22c disposed in the mount portion 20 are shown (shaded) with respect to the interchangeable lens 2 for explanation.

As shown in FIG. 4A, in the non-lock state of the interchangeable lens 2, the bayonet claws 22a, 22b, and 22c and the claw portions 131a, 131b, and 131c of the movable mount portion 130 do not overlap with each other on the optical axis projection. The interchangeable lens 2 is in the non-lock state (a state that the detaching is not regulated) where the interchangeable lens is attachable/detachable with respect to the camera body 1.

When the rotary tool 3 is rotated from the state of FIG. 4A in the direction of arrow B, the mount ring 110 and the movable mount portion 130 rotate in the direction of arrow B, and transition to the lock state where the detaching from the camera body of the interchangeable lens 2 is regulated. FIG. 4B shows the state in which the bayonet claws 22a, 22b, and 22c and the claw portions 131a, 131b, and 131c of the movable mount portion 130 are overlapped with each other on the optical axis projection with the interchangeable lens 2 mounted in the camera body 1.

It should be noted that, in the present embodiment, a state that the bayonet claws 22a, 22b, and 22c and the claw portions 131a, 131b, and 131c of the movable mount portion 130 are completely overlapped on the optical axis projection is referred to as a mount state (lock state), but the present invention is not limited thereto. For example, as an overlapped state between the camera body 1 and the claw portions of the interchangeable lens 2, a state that at least a part of the corresponding claws is overlapped may be referred to as the mount state.

When the interchangeable lens 2 is removed from an image pickup apparatus 1, the rotary tool 3 is rotated in the direction of arrow C shown in FIG. 4B to enter the state of FIG. 4A, and the interchangeable lens 2 becomes attachable/detachable with respect to the image pickup apparatus 1. It should be noted that the lens terminal 14 is disposed at such a position that the lens terminal 14 overlaps with the rotary tool 3 on the optical axis projection (or in the X axis direction) in the lock state of the interchangeable lens 2 as shown in FIG. 4B.

The reason why the configuration is employed is as follows. As described above, the interchangeable lens 2 is mounted in the lens mount 100 and the cable extending from the interchangeable lens 2 is connected to the lens terminal 14, which enables the interchangeable lens 2 and the camera body 1 to communicate with signals. However, in the related art, the interchangeable lens may be unfavorably removed from the lens mount while the cable is connected to the lens terminal. In this case, since the interchangeable lens and the camera body are connected through the cable, the cable or the interchangeable terminal may be damaged, or the interchangeable lens or the camera body may fall down.

On the contrary, the camera body 1 of the present embodiment is configured such that the lens terminal 14 is disposed at a lock position where the interchangeable lens 2 starts to rotate in the radial direction of the lens mount 100 as shown in FIG. 4B. With this configuration, in the lock state of the interchangeable lens 2, the lens terminal 14 and at least a part of the rotary tool 3 overlap each other when the camera body 1 is viewed from the front surface side. In other words, in the lock state of the interchangeable lens 2, the tool insertion portion 112 and at least a part of the rotary tool 3 inserted to the tool insertion portion 112 overlap with the lens terminal 14 in the radial direction of the lens mount 100.

With this configuration, for example, even when the interchangeable lens 2 is removed from the camera body 1 while the cable is connected to the lens terminal 14, it is not possible that the rotary tool 3 is inserted to the tool insertion portion 112 of the mount ring 110 due to the interference of the cable. In other words, with the above configuration, the camera body 1 of the present embodiment is configured such that the rotary tool 3 is inserted to the tool insertion portion 112 to rotate the mount ring 110 only when the cable is removed from the lens terminal 14. Therefore, it is possible to prevent forgetting to remove the cable, which inhibits damage on the cable or the lens terminal, and unintended falling of the interchangeable lens or the camera body 1.

Figure 5:
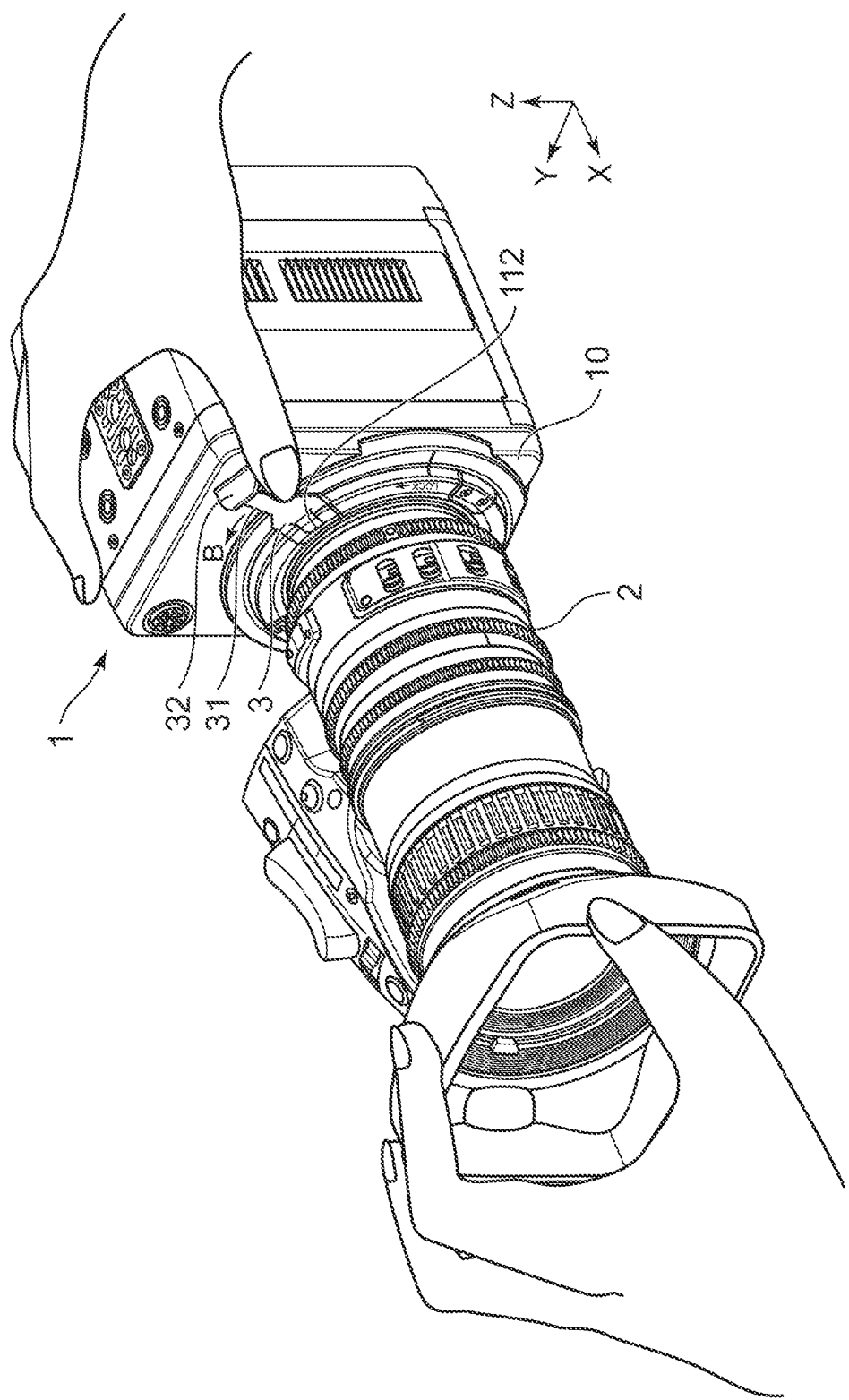
FIG. 5 is a view which is useful in describing a method for using a finger hold portion 32 of a rotary tool 3 according to the embodiment of the present invention.

Next, the operation method of the finger hold portion 32 when the rotary tool 3 is operated will be described with reference to FIG. 5. FIG. 5 is a view which is useful in describing a method for using the finger hold portion 32 of the rotary tool 3 according to the embodiment of the present invention. It should be noted that FIG. 5 shows a state where the interchangeable lens 2 is mounted in the camera body 1.

As shown in FIG. 5, when the interchangeable lens 2 is mounted, the external force is applied to the finger hold portion 32 of the rotary tool 3 inserted to the tool insertion portion 112 in a state where the mount portion 20 of the interchangeable lens 2 is inserted to the lens mount 100. For example, the external force is generated when the user operates the rotary tool 3 by a user's finger. The user may hold the camera body 1 using a finger other than the finger (for example, a thumb) with which the finger hold portion 32 is operated, and apply the force by the thumb on the rotary tool 3 to rotate in the direction of arrow B.

Since the tip end of the extension portion 31 is shaped to be bent in the X-axis positive direction, the finger hold portion 32 of the rotary tool 3 is easily held by fingers. In addition, the camera body 1 of the present embodiment employs an approximate flat shape in the front cover 10 and has no remarkable projecting place except the mount portion, which prevents the finger hold portion 32 to interfere with the front cover 10 and a lens barrel of the interchangeable lens 2 at the time of operating the rotary tool 3.

In addition, as shown in FIG. 4A, part of the finger hold portion 32 protrudes from the contour of the front cover 10 when viewed from the front surface of the camera body 1, which makes, for example, it easy to conveniently perform a rotating operation of the finger hold portion 32 using a finger only by moving a finger along the front cover 10.

It should be noted that the finger hold portion 32 of the rotary tool 3 is only operated by a hand other than the one used to mount the interchangeable lens 2 when the interchangeable lens 2 is removed from the camera body 1, and that the operation almost remains the same as the case where the interchangeable lens 2 is mounted.

In addition, as described above, the center operation portion 30*a* of the rotary tool 3 is fitted to the recess portion 112*a* of the lens mount 100, the first support portion 30*e* and the second support portion 30*f* are regulated to move in the X axis direction (or the optical axis direction) by the regulation portions 112*e*, 112*f* and the regulation portion 112*g*. Therefore, the rotary tool 3 does not fall out of the tool insertion portion 112 even when the user release the hand of the rotary tool 3 in the middle of operating the rotary tool 3.

With the above-described configuration, the lens mount 100 of the present embodiment can simply attach/detach the interchangeable lens 2 with respect to the camera body 1 by forming the tool insertion portion 112 in the mount ring 110 in a case where the dedicated rotary tool 3 is used. Similarly, the tool insertion portion 112 is shaped to hardly rotate the mount ring 110 using a general tool which can be easily prepared, and employs a shape (taper shape, etc.) so as not to come into contact with the rotary tool 3 at an unnecessary position and not to regulate the movement of the rotary tool 3. Therefore, the lens mount 100 of the present embodiment can effectively suppress theft of the interchangeable lens 2 without increasing the camera body 1 in size due to a complex structure.

Figure 6:
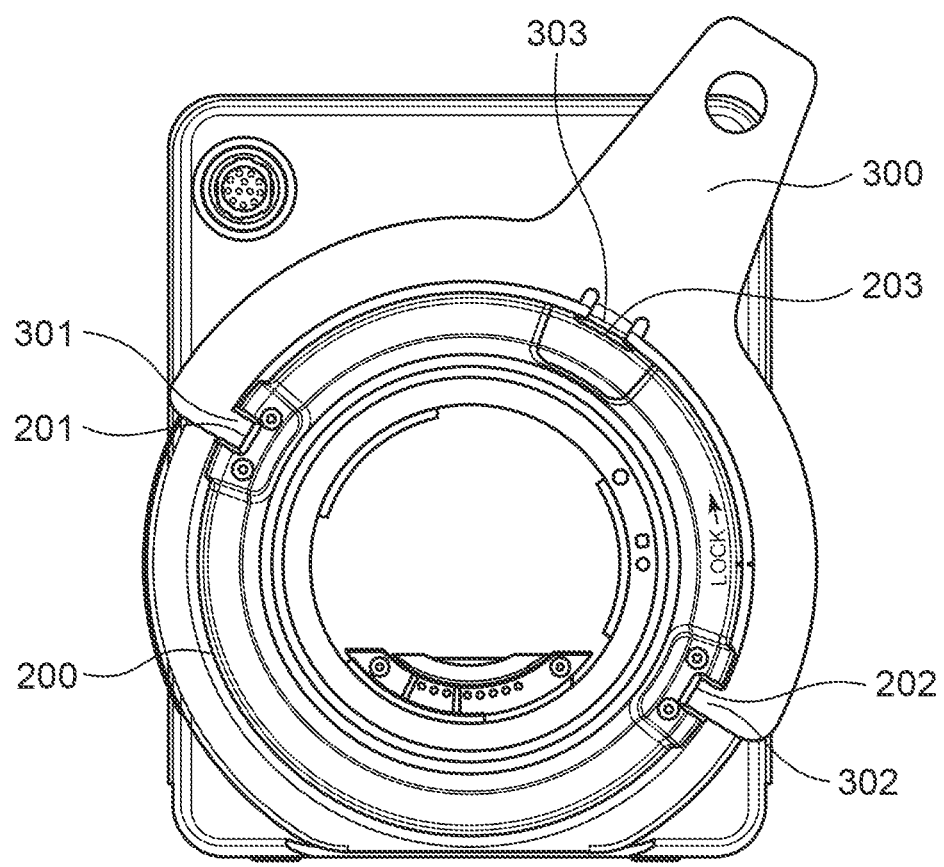
FIG. 6 is a view which is useful in describing an operation of a rotary tool 300 with respect to a lens mount 200 according to a variation of the present invention.

Hitherto, the description has been given about preferred embodiments of the present invention, but the present invention is not limited thereto. Various modifications and changes may be made within a scope of the spirit. For example, in the above-described embodiments, the regulation portions 112*e*, 112*f* are positioned on both sides of the recess portion 112*a* as a positional relation between the recess portion 112*a* of the tool insertion portion 112 and the regulation portions 112*e*, 112*f*, but the present invention is not limited thereto. For example, with the configuration as shown in FIG. 6, the regulation portion may be provided between two recess portions to regulate the movement of the rotary tool in the optical axis direction. FIG. 6 is a view which is useful in describing an operation of a rotary tool 300 with respect to a lens mount 200 according to a variation of the present invention.

As shown in FIG. 6, the recess portions 201, 202 are recesses formed in the lens mount 200. A regulation portion (wall portion) 203 is formed between the recess portions 201, 202 to regulate the movement of the rotary tool 300 in the optical axis direction. Then, the movable mount portion (not shown) of the lens mount 200 can rotate in a state where operation portions 301, 302 of the rotary tool 300 having almost the same dimensions as those of the recess portions 201, 202 are fitted to the recess portions. On the other hand, a support portion 303 formed in the rotary tool 300 is fitted to the regulation portion 203, so that the movement of the rotary tool 300 in the optical axis direction can be regulated.

In addition, the above-described embodiment has been described about the configuration that a single tool insertion portion 112 is disposed in the lens mount 100, but the present invention is not limited thereto. For example, a plurality of tool inserting places having almost the same as the tool insertion portion 112 may be disposed in the circumferential direction of the lens mount 100. With this configuration, the rotary tool 3 is not limited to one place to be inserted, which enables the rotary tool 3 to be inserted to an inserting place which is arranged at an angle for the user to easily use, to thereby make it possible to make an operation to detach the interchangeable lens 2.

In addition, the present embodiment has been described about the configuration that the single tool insertion portion 112 is disposed in the upper surface of the lens mount 100, but the present invention is not limited thereto. For example, the tool insertion portions 112 as shown in FIG. 2A may be set by rotating a layout angle of the tool insertion portions 112 in the circumferential direction at about 90°. In order to achieve the configuration, for example, the user may change a fixing angle to the base portion 140 of the lens mount 100 at an intended angle. With this configuration, it is possible to freely change a position where the interchangeable lens 2 is detached with respect to the camera body 1 using the rotary tool 3. Therefore, with the configuration, for example, it is possible to freely detach the interchangeable lens 2 regardless of a position where the camera body 1 is attached to the outside, and a position where an option device to be mounted to the camera body 1 is attached. In particular, in a case where an accessory shoe for a flash or a microphone is disposed in the camera body 1, it is possible to dispose the tool insertion portion 112 at a position where the accessory does not cause interference when the interchangeable lens 2 is attached or detached.

In addition, in the above-described embodiment, a case where the camera body 1 is a digital camera has been assumed as an example of the image pickup apparatus to implement the present invention, but the present invention is not limited thereto. For example, other image pickup apparatuses (a portable disk such as a digital video camera, and a stationary device such as a security camera, etc.) may be employed beside the digital camera.

In addition, the above-described embodiment has been described about the interchangeable lens 2 which is attachable/detachable with respect to the camera body 1 as an example of the accessory to implement the present invention, but the present invention is not limited thereto. For example, an accessory for the image pickup apparatus which is attachable/detachable with respect to the camera body 1 may be used for an image pickup apparatus having other flange back mechanism. Alternatively, the above-described accessory may be used for an interchangeable adaptor which is used to apply the interchangeable lens having different mount diameter to the image pickup apparatus. In other words, any other device may be employed insofar as the device provided with a mount portion (the mount portion 20) which is mountable to the lens mount 100, as the accessory for the image pickup apparatus to implement the present invention.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-164418, filed Aug. 29, 2017 which is hereby incorporated by reference wherein in its entirety.

What is claimed is:

1. A mount that is capable of being disposed in a main body of an image pickup apparatus, the mount comprising a first mount portion configured to be attachable/detachable with respect to an accessory,
wherein the first mount portion includes:
a fixing portion that is fixed to the main body of the image pickup apparatus;
a fixed mount portion that is fixed and held to the fixing portion;
a movable mount portion that is relatively rotatable with respect to the fixed mount portion with an optical axis of the image pickup apparatus as a center;
a mount ring that is rotatable with the movable mount portion; and
an insertion portion to which an operation member to switch a non-lock state and a lock state of the accessory with respect to the first mount portion is inserted from an outside of the first mount portion,
the insertion portion includes a first fitting portion to which an operation portion of the operation member is fitted, and a second fitting portion to which a support portion different from the operation portion of the operation member is fitted,
the first fitting portion is formed by an opening that is formed by opening a side where the accessory is mounted in the optical axis direction, and a pair of wall portions that are opposed to each other with reference to the circumferential direction of the first mount portion, and
the second fitting portion has a regulation portion to regulate a movement of the operation member in the optical axis direction in a state where the operation member is fitted, and is disposed at a position different from the first fitting portion in the optical axis direction.

2. The mount according to claim 1, wherein the first mount portion is coupled to a second mount portion disposed in the accessory by a bayonet coupling system.

3. The mount according to claim 1, wherein the fixed mount portion includes a plurality of claw portions in the image pickup apparatus that is engaged, in the optical axis direction, with a plurality of claw portions in the accessory provided in the second mount portion.

4. The mount according to claim 1, wherein the regulation portion includes a plurality of regulation portions that come into contact with a support portion of the operation member in the optical axis direction in a state where the operation member is inserted to the insertion portion, and
the second fitting portion is formed by the plurality of regulation portions.

5. The mount according to claim 4, wherein the opening is positioned between the plurality of regulation portions in the circumferential direction of the first mount portion.

6. The mount according to claim 1, wherein a plurality of the first fitting portions are provided in the circumferential direction of the first mount portion, and
the second fitting portion is provided between the plurality of the first fitting portions in the circumferential direction of the first mount portion.

7. The mount according to claim 1, wherein the second fitting portion does not regulate a movement of the operation member in the circumferential direction of the first mount portion perpendicular to the optical axis.

8. The mount according to claim 7, wherein the second fitting portion includes a taper portion in the circumferential direction of the first mount portion perpendicular to the optical axis so as not to regulate a movement of the operation member in the circumferential direction of the first mount portion.

9. The mount according to claim 1, wherein the wall portion of the first fitting portion is formed with a taper portion along the opening on a side where the accessory is mounted.

10. An image pickup apparatus having a mount that is capable of being disposed in a main body of an image pickup apparatus,
the mount comprising a first mount portion configured to be attachable/detachable with respect to an accessory,
wherein the first mount portion includes:
a fixing portion that is fixed to the main body of the image pickup apparatus;
a fixed mount portion that is fixed and held to the fixing portion;
a movable mount portion that is relatively rotatable with respect to the fixed mount portion with an optical axis of the image pickup apparatus as a center;
a mount ring that is rotatable with the movable mount portion; and
an insertion portion to which an operation member to switch a non-lock state and a lock state of the accessory with respect to the first mount portion is inserted to an outer peripheral portion of the first mount portion,
the insertion portion includes a first fitting portion to which an operation portion of the operation member is fitted, and a second fitting portion to which a support portion different from the operation portion of the operation member is fitted,
the first fitting portion is formed by an opening that is formed by opening a side where the accessory is mounted in the optical axis direction, and a pair of wall portions that are opposed to each other with reference to the circumferential direction of the first mount portion, and
the second fitting portion has a regulation portion to regulate a movement of the operation member in the optical axis direction in a state where the operation member is fitted, and is disposed at a position different from the first fitting portion in the optical axis direction.

11. The image pickup apparatus according to claim 10, further comprising a terminal of the image pickup apparatus configured to communicate with the accessory in an outer peripheral portion of the first mount portion by being electrically connected to a terminal of the accessory disposed in the accessory, wherein the terminal of the image pickup apparatus overlaps with at least a part of the operation member in a state where the operation member is inserted to the insertion portion in a radial direction of the first mount portion in the lock state of the accessory with respect to the first mount portion.

12. The image pickup apparatus according to claim 10, wherein the insertion portion is capable of receiving an operation member provided with an extension portion extending from an insertion side of the insertion portion, and a tip end of the extension portion protrudes from a contour of the main body of the image pickup apparatus in a direction perpendicular to the optical axis.

13. The image pickup apparatus according to claim 12, wherein the tip end of the extension portion is bent not to interfere with the accessory in a state where the accessory is mounted in the first mount portion.

* * * * *